(No Model.) 2 Sheets—Sheet 1.

C. E. LINDSTRÖM.
HAY LOADER.

No. 522,992. Patented July 17, 1894.

Witnesses:
R. H. McCoy
Blanche K. Cleland

Inventor:
Carl E. Lindström
by Att'ny Harold A. Field (No Model.) 2 Sheets—Sheet 2.

C. E. LINDSTRÖM.
HAY LOADER.

No. 522,992. Patented July 17, 1894.

Witnesses:
R. H. McCoy
Blanche K. Cleland

Inventor:
Carl E. Lindström
by Att'y Harold A. Weld

UNITED STATES PATENT OFFICE.

CARL E. LINDSTRÖM, OF ROCK ISLAND, ILLINOIS, ASSIGNOR OF TWO-THIRDS TO HAROLD A. WELD AND J. W. MORSE, OF SAME PLACE.

HAY-LOADER.

SPECIFICATION forming part of Letters Patent No. 522,992, dated July 17, 1894.

Application filed August 12, 1893. Serial No. 482,996. (No model.)

*To all whom it may concern:*

Be it known that I, CARL E. LINDSTRÖM, a citizen of the United States, residing at Rock Island, in the county of Rock Island and State of Illinois, have invented a new and useful Improvement in Hay-Loaders, of which the following is such a full, clear, and exact description as will enable others skilled in the art to which it appertains to make and use the same.

My invention relates to improvements in hay-loaders in which the hay is elevated and thrown upon the wagon by reciprocating elevator bars, operating in conjunction with rakes which pick up the hay from the ground, and the object of my invention is to provide an improved means for imparting motion to the said bars, and to combine certain other new and useful improvements so as to produce a simple, cheap and durable machine. I attain these objects by means of the mechanism claimed and illustrated in the accompanying drawings, wherein the same character of reference refers to the same part in the several views.

Figure 1:
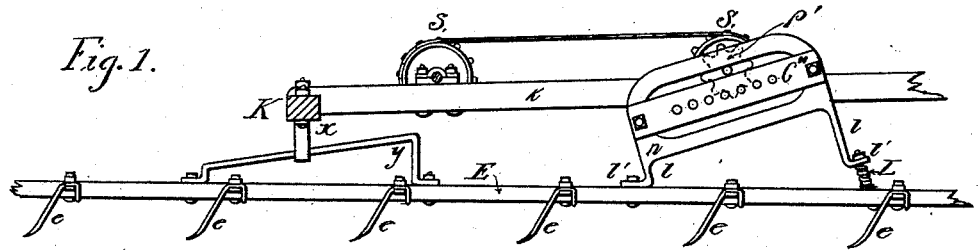
Figure 2:
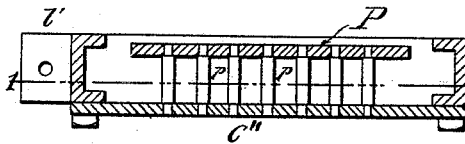
Figure 3:
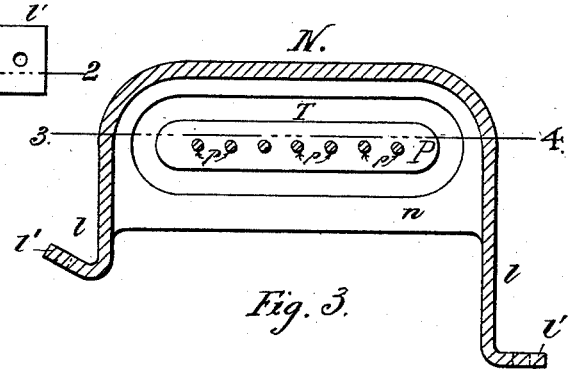
Figure 6:
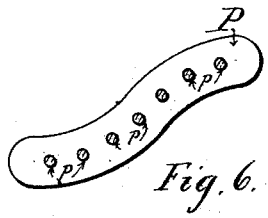
Figure 4:
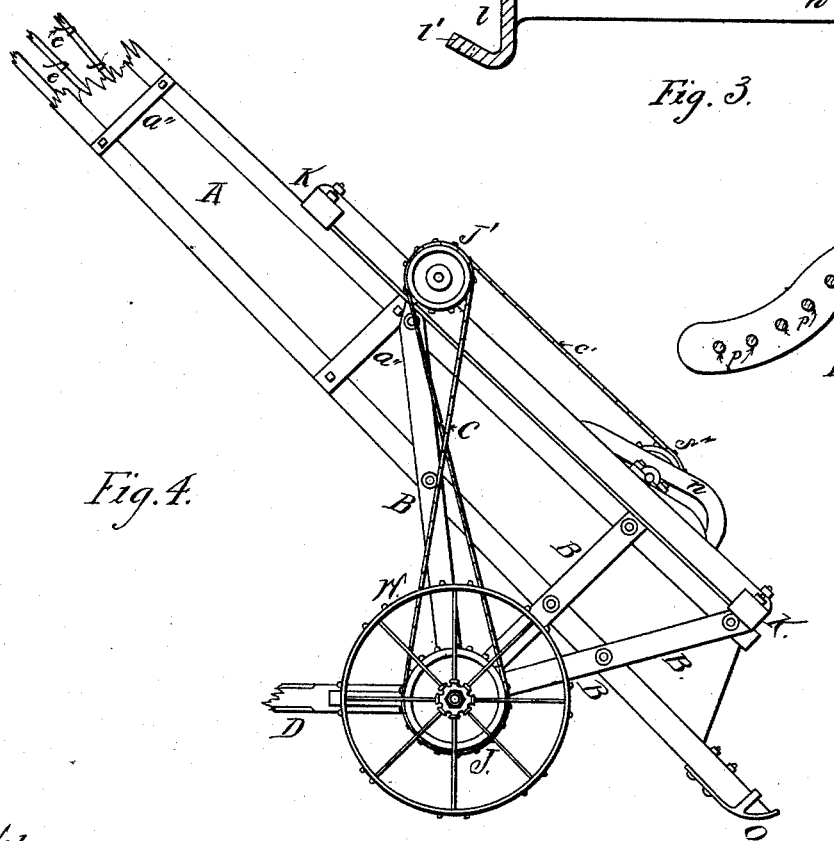
Figure 5:
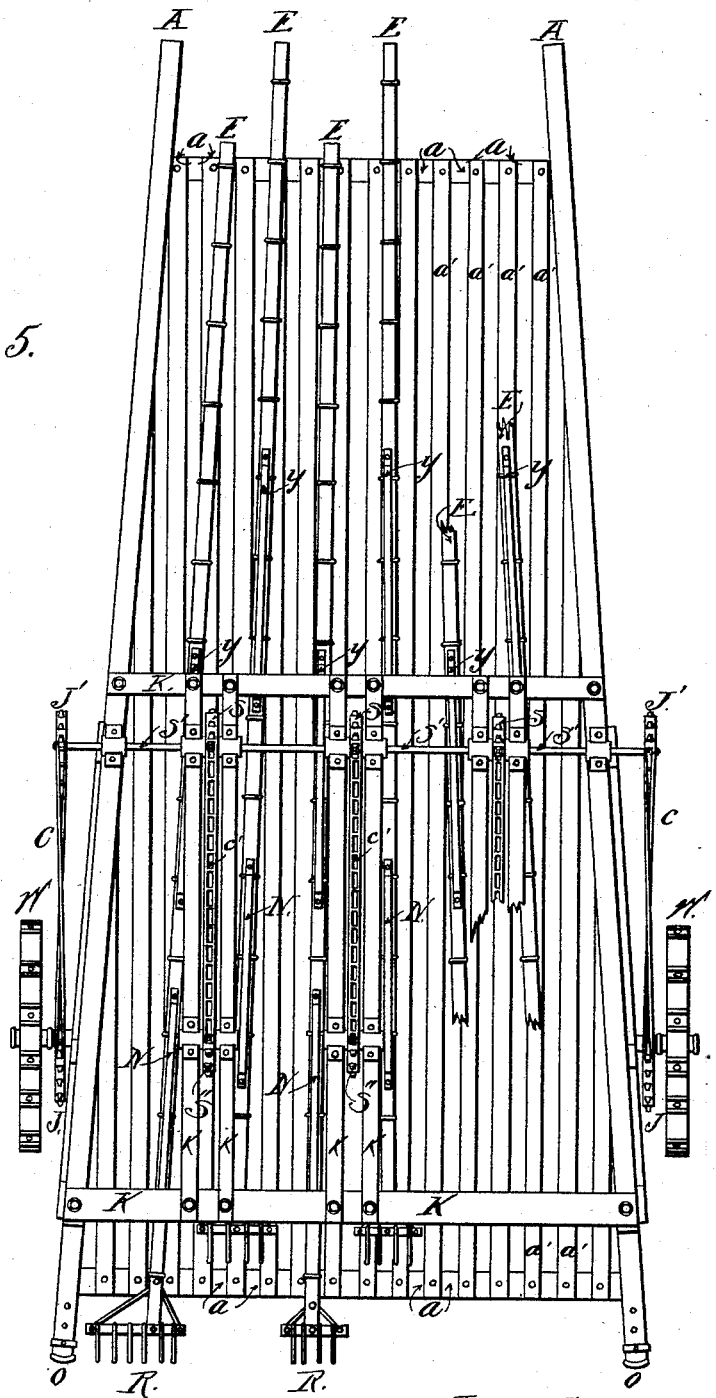

Figure 1 is a side elevation of a portion of an elevator bar with its rack and pinion. Fig. 2. is a horizontal cross section of the rack on the line 3—4 in Fig. 3. Fig. 3, is a vertical section on the line 1—2 in Fig. 2. Fig. 4 is a side elevation of a portion of the hay-loader. Fig. 5, is a plan of the same. Fig. 6, shows a modified form of the rack.

As shown in the drawings, my improved hay-loader is designed to be attached to the rear of the wagon to be loaded by means of the draw-bar D. The weight of the machine is carried by the wheels W, W, armed with peripheral spurs for engaging the surface of the ground. The upper end of hay-loader extends for some distance above the wagon, and the lower end is armed with the iron shoe O adapted to bear upon the earth. From the axle, which revolves with the wheels W, W, the braces B, B, B, radiate upward and support the frame-work of the machine. The said framework consists of the side-pieces A, A, connected by the cross-bars a, a, at top and bottom, on the under side. To the cross-bars a, a, are secured the longitudinal slats a', a', a', a', forming the bed of the machine over which the hay travels propelled by the elevator bars E, E. The elevator-bars E, E, are armed on their lower sides with spring teeth e, e, e, e, pointing slightly upward. The elevator bars have motion imparted to them by the means hereinafter described so that they are alternately lowered near to the bed of the machine and moved upward while in that position, and then raised and moved backward and downward while elevated. The lower extremity of each elevator-bar has attached to it a rake R, which rakes are adapted to gather the hay lying in the swath, raise it, and bring it under the spring teeth of the elevator-bars whereby it is gradually moved forward and upward and discharged upon the wagon.

The frame-work of the machine, its manner of attachment to the wagon, the elevator bars and the rakes at their lower ends do not differ materially from those of other hay-loaders, designed like this to be attached to the rear of the wagon and to gather the hay as the wagon is slowly driven over the field, my invention consisting rather in the improved means of imparting motion to the said elevator bars and rakes.

The side pieces A, A, carry on their upper sides the cross-bars K, K, which in turn carry the longitudinal slats k, k, arranged in pairs as shown in Fig. 5. The side pieces A, A, are reinforced by the braces a'', a''.

On the axle of the machine near the wheels on either side are carried the sprocket wheels J, J, which by means of the drive chain C impart motion to the smaller sprocket wheels J', J', and the shaft S', which is journaled upon the side pieces A, A, and the pairs of slats k, k. The shaft S' bears a sprocket wheel S, between each pair of slats k, k. The sprocket wheels S, S, actuate by means of the drive-chains c' c' the sprocket wheels S'' S''. Each sprocket wheel S'' S'' is borne upon an independent shaft, to which it imparts motion, journaled upon the corresponding pair of slats k, k, and bearing upon its ends, just outside the slats k, k, pinion wheels P' (Fig. 1). The elevator bars E, E, are also arranged in pairs so as to correspond to the pairs of slats and pinions. Upon each elevator bar is mounted a broad strip or band of metal N, of the contour shown in Fig. 3, having the two legs $l$, $l$, and corresponding feet, $l'$, $l'$. The upper leg is short and its foot is bolted loosely to the elevator bar; the lower leg is longer and the coil spring L interposes between its foot and the elevator bar, so as to give, and relieve strain upon breakable parts in case the rake meets an obstruction. On each side of the strip N a sheet of metal $n$ extends across from leg to leg, near the bottom, but at the top and ends it is narrowed to a flange so as to leave an elongated oval opening in the sheet $n$. On the side of N farthest from the pinion is bolted or otherwise firmly secured the metal strip C'', in which are firmly set the row of steel pins or spindles $p$, $p$., which extend inward and bear upon their inner ends the metal strip P.

The strip P corresponds in shape to the contour of the edge of the elongated oval opening aforesaid in the sheet $n$, but is smaller in its dimensions so as to leave a narrow track T, for the shaft bearing the pinion P' between the strip P and the inner edge of the sheet $n$. The shaft bearing the pinion extends within the space between the inner and outer sheets, $n$, and bears its pinion between them so that its teeth mesh with the spindles $p$, $p$, as a rack. As the pinion revolves the rack travels under it until the end of the rack is reached, the shaft traveling in the track T. At the end the peculiar contour of the track T has the effect of forcing the pinion to elevate the rack, which then travels back above it until the opposite end is reached when the process is reversed, the track forces the rack again below the pinion and the track travels under the pinion as at first. The elevator bar is thus caused to move upward while the rack is below the pinion, and when the pinion passes under the rack, the elevator bar is raised and moved downward till the limit of the rack is reached. The rakes at the ends of the elevator bars come in contact with the ground at the end of the downward sweep and gather hay as the bar moves forward and upward. Each pair of elevator bars are so adjusted that their racks are at all times in exactly opposite positions on the pinions so that while one is moving forward and upward, the other is moving backward and downward, and vice versa. The rakes should be wide enough so that they may well cover the ground and allow no hay to escape them. It is evident that by this arrangement the extent of movement of the elevator bars is dependent solely upon the length of the rack, and that the velocity with which they move depends upon the rapidity of the motion of the pinions, which is regulated by the relative sizes of the sprocket wheels. Owing to the unequal length of the legs $l$, $l$, the rack $p$, $p$, is not parallel to the elevator bar, but is inclined to it in such a manner that the upper end of the rack is nearer the bar than the lower. The elongated loop $y$ on the upper side of the elevator bar, of which the upper leg is shorter than the lower, passes through the corresponding loop $x$ on the lower side of the cross bar K, and guides the upper portion of the elevator bar and limits its play. The result of this limitation of the vertical motion of the elevator bar and the inclination of the rack is that the lower end of the elevator bar bearing the rake moves in such a manner as to cause the rake to be dragged along the ground for a considerable distance, exerting a constant pressure at the varying angles until, when it is nearly in contact with the lower cross bar $a$, it is raised and moved backward for another similar sweep. In this manner the hay is brought within reach of the teeth $e$, $e$, of the elevator bars and discharged onto the wagon after being gradually moved upward over the slats $a'$ $a'$.

It is obvious that the extent and direction of the sweep of the rakes is dependent upon the length, contour and angle of inclination of the rack to the elevator bar, and that any or all of these may be varied indefinitely without departing from the spirit of my invention. For instance, the rack may be of a serpentine form as shown in Fig. 6, in which case the track T would be made to correspond in outline. Similarly, the rack might be circular, or oval or of any contour necessary to produce the desired motion of the rakes by the action of the pinion wheel upon it.

There may be as many pairs of elevator bars, equipped as described, as may be necessary or desirable and the number may be varied in different machines. I contemplate the possibility, moreover, that more than one elevator bar may be actuated by a single rack and pinion, by fastening the elevator bars together in sets of two or more, but I prefer a rack and pinion to each bar, as described in the drawings.

Having thus described my invention, what I claim as new, and desire to secure by Letters Patent, is—

1. In a hay loader, movable elevator bars, racks carried by said bars inclined at an angle thereto, a cam track about the rack a pinion engaging said rack and adapted in the rotation of said pinion to cause said rack to rise and fall and means for rotating the pinions, substantially as described.

2. In a hay loader, movable elevator bars, racks carried by said bars, said racks being supported in an inclined position with one end under spring tension, a pinion engaging the rack and means for operating the pinion and to cause the rack to move around the same, substantially as described.

3. In a hay loader, movable elevator bars, racks carried by said bars inclined at an angle thereto, pinions engaging said racks and adapted in the rotation of said pinions to cause said racks to rise and fall, guides for the pinions, means for rotating the pinions and loops $x$—$y$ acting as guides for the front ends of the bars, substantially as described.

4. In a hay loader, elevator bars, inclined racks provided with a cam track above and below the rack, a pinion engaging the rack and having an extension engaging the cam track and means for operating the pinion, substantially as described.

5. In a hay-loader the combination of a double rack so constructed as to pass alternately over and under a stationary pinion, with an elevator bar upon which said rack is supported at an angle so that the upper extremity of said rack is nearer the elevator bar than its lower extremity, said rack and pinion being adapted to impart motion to said elevator bar.

CARL E. LINDSTRÖM.

Witnesses:
HAROLD A. WELD,
J. W. MORSE.